United States Patent
Robadey

(10) Patent No.: US 11,934,904 B2
(45) Date of Patent: Mar. 19, 2024

(54) RFID DEVICE AND METHOD OF MANUFACTURING THE SAME

(71) Applicant: ASSA ABLOY AB, Stockholm (SE)

(72) Inventor: Jean-Miguel Robadey, Bossonnens (CH)

(73) Assignee: ASSA ABLOY AB, Stockholm (SE)

( * ) Notice: Subject to any disclaimer, the term of this patent is extended or adjusted under 35 U.S.C. 154(b) by 0 days.

(21) Appl. No.: 17/615,438

(22) PCT Filed: Jun. 14, 2019

(86) PCT No.: PCT/EP2019/065741
§ 371 (c)(1),
(2) Date: Nov. 30, 2021

(87) PCT Pub. No.: WO2020/249240
PCT Pub. Date: Dec. 17, 2020

(65) Prior Publication Data
US 2022/0230043 A1    Jul. 21, 2022

(51) Int. Cl.
*G06K 19/077* (2006.01)
*G06K 19/02* (2006.01)
*G06K 19/07* (2006.01)

(52) U.S. Cl.
CPC ..... *G06K 19/07786* (2013.01); *G06K 19/027* (2013.01); *G06K 19/0723* (2013.01); *G06K 19/07758* (2013.01)

(58) Field of Classification Search
CPC ............................................... G06K 19/07786
(Continued)

(56) References Cited

U.S. PATENT DOCUMENTS

| 2004/0206799 A1* | 10/2004 | Wong .................. H01R 43/0263 228/180.5 |
| 2006/0176181 A1* | 8/2006 | Halope ................... B42D 25/22 257/679 |

(Continued)

FOREIGN PATENT DOCUMENTS

| CN | 106650896 A | 5/2017 |
| EP | 3063705 A1 | 9/2016 |

(Continued)

OTHER PUBLICATIONS

"International Application Serial No. PCT/EP2019/065741, International Search Report dated Feb. 17, 2020", 5 pgs.

(Continued)

*Primary Examiner* — Rafferty D Kelly
(74) *Attorney, Agent, or Firm* — Schwegman Lundberg & Woessner, P.A.

(57) ABSTRACT

An RFID device that can be connected to a piece of material, in particular, a piece of fabric (22), in an efficient manner and that is small and flexible is provided. A wire antenna (16) is coupled to an integrated circuit provided on a substrate (12) of the RFID device (10). The wire antenna (16) is attached to the substrate (12) by being laced with the substrate (12) via a pair of through holes. In this state, the wire antenna (16) is fixedly connected to the piece of material by heating a coating of the wire antenna (16), which coating includes a thermoset adhesive material. In this manner, the substrate (12) is connected to the piece of material via the wire antenna (16).

17 Claims, 1 Drawing Sheet

(58) Field of Classification Search
USPC .......................................................... 235/492
See application file for complete search history.

(56) References Cited

U.S. PATENT DOCUMENTS

2014/0326790 A1    11/2014  Xu et al.
2014/0326791 A1*   11/2014  Ishida ................ G06K 19/0723
                                                29/25.01

FOREIGN PATENT DOCUMENTS

EP          3063705         12/2017
WO     WO-2018011736 A1      1/2018
WO     WO-2020249240 A1     12/2020

OTHER PUBLICATIONS

"International Application Serial No. PCT/EP2019/065741, Written Opinion dated Feb. 17, 2020", 7 pgs.
"European Application Serial No. 19730779.6, Response Filed May 10, 2022 to Communication Pursuant to Rules 161(1) and 162 EPC dated Dec. 2, 2021", No Claims, 8 pgs.
"European Application Serial No. 19730779.6, Communication Pursuant to Article 94(3) EPC dated Nov. 24, 2022", 5 pgs.
"European Application Serial No. 19730779.6, Response Filed Mar. 20, 2023 to Communication Pursuant to Article 94(3) EPC dated Nov. 24, 2022", 9 pgs.

* cited by examiner

RFID DEVICE AND METHOD OF MANUFACTURING THE SAME

CROSS-REFERENCE TO RELATED APPLICATION(S)

The present application is a national stage application under 35 U.S.C. § 371 of PCT Application No. PCT/EP2019/065741, titled "RFID Device and Method of Manufacturing the Same," filed Jun. 14, 2019, which is hereby incorporated by reference herein in its entirety.

TECHNICAL FIELD

The present disclosure generally relates to radio frequency identification (RFID) devices, in particular, to an RFID device configured to be attached to a piece of material, for example, a piece of fabric, and a method of manufacturing the same.

BACKGROUND

Generally, RFID devices such as, for example, RFID cards, RFID tags, etc. include an RFID antenna and an integrated circuit connected to the RFID antenna. Upon presence of an electromagnetic field emitted by a reader device, the RFID antenna supplies energy from the electromagnetic field to the integrated circuit, which integrated circuit may communicate with the reader device using radio frequency (RF) communication protocols. In this manner, for example, data can be read from a memory associated with the integrated circuit, and can also be written into said memory, if desired.

US 2019/0012587 A1 discloses an RFID transponder including a plastic package which accommodates transponder components such as a chip and an antenna as integrated components.

The present disclosure is directed, at least in part, to improving or overcoming one or more aspects of prior systems.

SUMMARY OF THE DISCLOSURE

According to one aspect of the present disclosure, an RFID device comprises a substrate, an integrated circuit mounted on the substrate, and a wire antenna coupled to the integrated circuit to allow the integrated circuit to perform RFID communications via the wire antenna. The substrate includes an attachment portion for attaching the wire antenna to the substrate. Further, the wire antenna includes a connecting portion configured to connect the wire antenna to a piece of material, in particular, a piece of fabric, in a state of being attached to the substrate. Accordingly, the substrate is configured to be connected to the piece of material via the wire antenna.

According to another aspect of the present disclosure, a method of manufacturing an RFID device comprises providing a substrate having an integrated circuit mounted on the same, attaching a wire antenna to the substrate, the wire antenna being coupled to the integrated circuit to allow the integrated circuit to perform RFID communications via the wire antenna, and connecting the wire antenna to a piece of material, in particular, a piece of fabric, in a state of being attached to the substrate, to thereby connect the substrate to the piece of material via the wire antenna.

According to a further aspect, a product, for example, a piece of clothing, comprises the RFID device of the above aspect connected to the product via the wire antenna.

Other features and aspects of the present disclosure will be apparent from the following description and the accompanying drawings.

DETAILED DESCRIPTION

Figure 1:
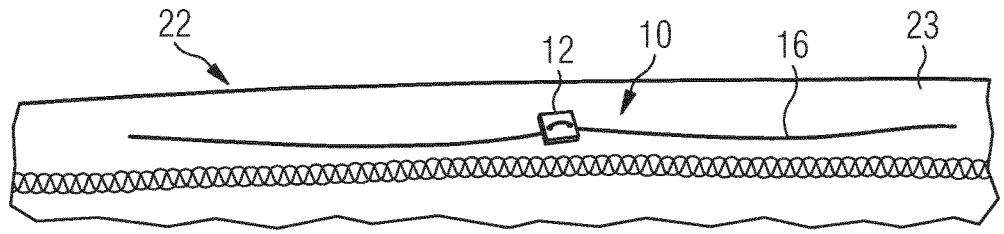
FIG. 1 is a plan view of an RFID device provided on a piece of fabric.

The following is a detailed description of exemplary embodiments of the present disclosure. The exemplary embodiments described herein are intended to teach the principles of the present disclosure, enabling those of ordinary skill in the art to implement and use the present disclosure in many different environments and for many different applications. Therefore, the exemplary embodiments are not intended to be, and should not be considered as, a limiting description of the scope of protection. Rather, the scope of protection shall be defined by the appended claims.

The present disclosure is based at least in part on the realization that commonly used RFID devices for, for example, pieces of clothing, may have a size that makes it difficult for the RFID device to be connected to the piece of clothing in such a manner that it is invisible or mostly invisible. In addition, the RFID device may be rigid and create a feeling of discomfort when being worn. In addition, the RFID device can easily be detected. Further, attachment of the RFID device to the piece of clothing may be difficult and require several steps including, for example, sewing, patching or inserting the RFID device into a pouch formed in the piece of clothing. Accordingly, it is desirable to reduce the size of the RFID device, increase the flexibility of the same, make it harder to detect the same, and also simplify the process for attaching the same to the piece of fabric.

In addition, the present disclosure is based at least in part on the realization that it may be desirable to provide the RFID device such that it has a form factor which allows for embedding the RFID device into a piece of material, for example, a hem of a piece of clothing or the like.

The present disclosure is based on the realization that the size of the RFID device can be substantially reduced when any packaging or housing for accommodating an integrated circuit and an antenna of the RFID device are removed/omitted. Instead, it has been realized that it is advantageous to connect the RFID device to the piece of material via the wire antenna. In particular, it has been realized that the wire antenna can be attached to a substrate of the RFID device, and can then be connected to the piece of material to thereby also connect the substrate of the RFID device to the piece of material. In particular, it has been realized that it may be advantageous to provide an attachment portion in the form of one or more through holes in the substrate for passing the wire antenna through said through holes prior to connecting the same to the piece of material. Thereby, the substrate is held on the piece of material by the wire antenna.

The present disclosure is also based on the realization that a coating of the wire antenna can be used in an advantageous manner to connect the same, for example, to the piece of material. For example, such a coating can be formed from a material having a thermoset capability, which allows connecting the wire antenna to the piece of material simply by heating the wire antenna with the coating, similar to a known patching process.

Referring now to the drawings, FIG. 1 shows a plan view of an RFID device 10 in accordance with the present disclosure. As shown in FIG. 1, RFID device 10 comprises a substrate 12 and a wire antenna 16 configured to be connected to a piece of fabric 22. In the exemplary embodiment, the piece of fabric is a piece of clothing having a hem 23. For the sake of illustration, RFID device 10 is shown in FIG. 1 as being arranged on top of hem 23. In practice, however, RFID device is embedded in hem 23 after being attached. As shown in FIG. 1, wire antenna 16 extends from substrate 12 on opposite sides of the same in a substantially linear manner. In particular, RFID device 10 is configured to be arranged on piece of fabric 22 in such a manner that it extends substantially parallel to hem 23, such that RFID device 10 can be embedded into hem 23 in a known manner after having been connected to piece of fabric 22. Such techniques for embedding are well-known and will therefore not be described herein.

Figure 2:
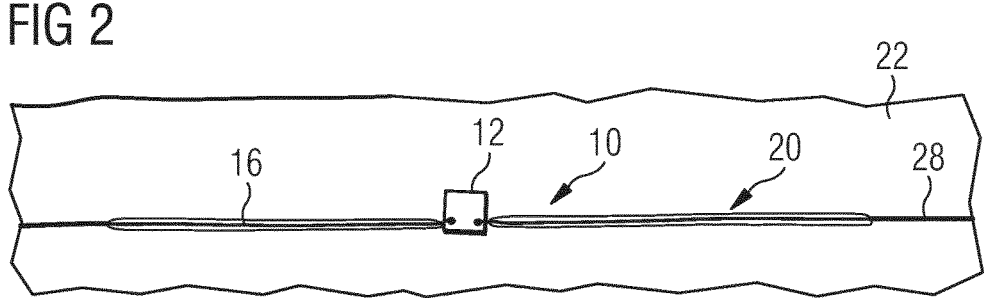
FIG. 2 is a plan view of the RFID device connected to the piece of fabric.
Figure 3:
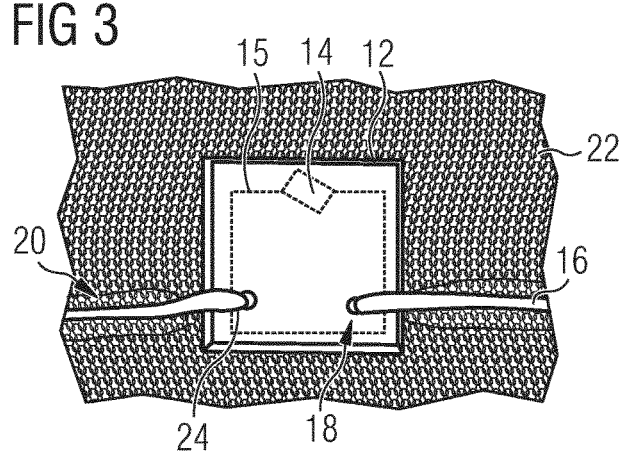
FIG. 3 is a detailed view of a substrate of the RFID device in FIG. 2.

As shown in more detail in FIGS. 2 and 3, RFID device 10 comprises an integrated circuit 14 mounted on substrate 12 in a known manner. Further, wire antenna 16 is coupled to integrated circuit 14 to allow integrated circuit 14 to perform RFID communications via wire antenna 16. For example, integrated circuit 14 may be configured to be inductively coupled to wire antenna 16, via a coupling loop 15 provided on substrate 14 and electrically connected to integrated circuit 14 in a known manner. Further, as shown in FIG. 3, wire antenna 16 is attached to substrate 12 via an attachment portion 18 of substrate 12. In the exemplary embodiment, attachment portion 18 includes a pair of through holes 24 formed in substrate 12, and wire antenna 16 is passed through the pair of through holes 24 to extend from opposite sides of substrate 12, as shown in FIG. 2. In the exemplary embodiment, the pair of through holes 24 is formed on opposite sides of substrate 12, at a position adjacent to two corner portions of substrate 12 provided on one side of substrate 12. Of course, it will be appreciated that the pair of through holes can be provided at any appropriate position of substrate 12, at least as long as it can be assured that a coupling portion 26 (see FIG. 4) of wire antenna 16 that extends across the substrate between the pair of through holes 24 can be inductively coupled to integrated circuit 14.

As shown in FIG. 2, wire antenna 16 includes a connecting portion 20 configured to be connected to the piece of fabric 22 in a state of being attached to substrate 12. In particular, connecting portion 20 may include a coating 28 of wire antenna 16. Coating 28 is provided in at least one portion of wire antenna 16 and is configured to be fixedly connected to the piece of fabric 22. In the exemplary embodiment shown in FIG. 2, coating 28 is provided over the entire length of wire antenna 16. This has the advantage that wire antenna 16 can be easily attached to substrate 14, without having to make sure that a coated portion of the same has a specific positional relationship with respect to substrate 12 and/or piece of fabric 22. However, in other embodiments, only part of wire antenna 16 may be covered by coating 28.

In the present example, coating 28 may include a thermoset adhesive material, for example, a thermoset PU material, and wire antenna 16 may be configured to be connected to piece of fabric 22 via heating of the portion of coating 28 including the coating with the thermoset adhesive material. This is shown in FIG. 2, where portions of wire antenna 16 adjacent to substrate 12 are shown in a state of being connected to piece of fabric 22 after having been heated in an appropriate manner. Attachment of thermoset adhesive materials to, in particular, pieces of fabric, for example, in a known patching process, are well-known, such that the description will be omitted. It is evident from FIG. 2 that, with the portions of wire antenna 16 adjacent to substrate 12 being connected to (fused with) piece of fabric 22, due to the fact that wire antenna 16 is attached to substrate 12 via through holes 24 (see FIG. 3), substrate 12 is also connected to piece of fabric 22 via wire antenna 16 in this manner. Therefore, substrate 12 does not need to have a further connecting portion for connecting substrate 12 to RFID device 10. This greatly simplifies the connection of RFID device 10 to piece of fabric 22.

Figure 4:
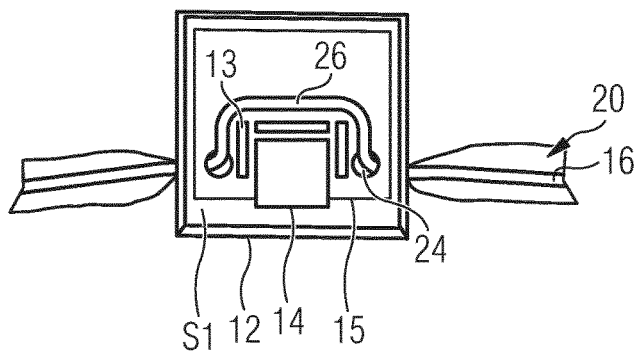
FIG. 4 is a bottom view of a substrate of an exemplary RFID device in accordance with the present disclosure.

As shown in FIG. 4, in the example described above, attachment portion 18 includes the pair of through holes 24 formed in substrate 12, and wire antenna 16 is attached to substrate 12 by being passed through the pair of through holes 24 from a first side S1 of substrate 12 (in FIG. 4, S1 corresponds to the bottom side of substrate 12). Further, as previously mentioned, wire antenna 16 includes coupling portion 26 extending across substrate 12 between the pair of through holes 24. In some embodiments, substrate 12 may include a guide portion 13, for example, one or more ribs or the like, configured to guide coupling portion 26 on substrate 12. In this manner, it can be assured that coupling portion 26 has a desired positional relationship with respect to integrated circuit 14, more particularly, coupling loop 15. It should be mentioned that piece of fabric 22 is omitted from FIG. 4 for the sake of illustration. In this manner, wire antenna 16 can be reliably coupled to integrated circuit 14. It will be appreciated that the single coupling loop 15 shown in FIG. 4 is only exemplary, and coupling loop 15 may include a plurality of loops, for example, two or three loops.

While in the example shown in FIG. 3 coupling portion 26 extends substantially straight between the pair of through holes 24, it will be appreciated that, in other embodiments, coupling portion 26 may at least partly surround integrated circuit 14. For example, an appropriate guide portion 13 may be provided to guide coupling portion 26 accordingly, for example, to extend between through holes 24 as three sides of a rectangular shape, as shown in FIG. 4.

In some embodiments, guide portion 13 may be provided to cover at least part of coupling portion 26 provided on the substrate 12. For example, guide portion 13 as shown in FIG. 4 may include a one or more additional ribs and a top portion (not shown) provided over coupling portion 26 and connecting the ribs of guide portion 13. In this case, wire antenna 16 can be inserted through a passage formed in guide portion 13.

The coating may be formed from, for example, PU or a similar material, and may be configured to connect wire antenna 16 to piece of fabric 22 by being heated to a temperature in a range between 190° C. and 220° C.

In the above example, wire antenna 16 is configured as a linear dipole antenna. However, it will be readily appreciated that wire antenna 16 may have any appropriate configuration that allows for RFID communications between RFID device 10 and an external reader device. For example, a support layer (not shown) may be provided, on which wire antenna 16 having a desired arrangement (for example, one or more meanders) is arranged prior to being connected to piece of fabric 22, and the support layer may be removed during or after connection of wire antenna 16 to piece of fabric 22.

Although in the example described above connecting portion 20 includes a pair of through holes 24, it will be appreciated that, in other embodiments, only a single through hole or several pairs of through holes 24 may be provided. Also in this case, wire antenna 16 may be inserted through through hole 24, and mounting portions 20 of wire antenna 16 may then be connected to piece of fabric 22, for example, by heating in the above-described manner.

In addition, although in the above-described example wire antenna 16 is attached to substrate 12 by being inserted through through holes 24, in other embodiments, wire antenna 16 may be attached to substrate 12 in a different manner, for example, by welding or the like. In this case, integrated circuit 14 may also be electrically connected to wire antenna 16. In other embodiments, wire antenna 16 and substrate 12 may be integrally provided, for example, on a support layer similar to the one mentioned above. However, also in this case, substrate 12 can be connected to piece of fabric 22 via wire antenna 16, for example, by the above-described connection of mounting portion 20 by heating coating 28 of wire antenna 16 in a state in which the same is attached to substrate 12. In some embodiments, an appropriate engagement portion can be provided on substrate 12, for example, a clamping portion or the like for engaging a portion of wire antenna 16.

Further, although mounting portion 20 has been described above as a coating 28 that fixedly connects wire antenna 16 to piece of fabric 22, in other embodiments, different mounting portions including, for example, clamping portions, Velcro strips, pins etc. can be provided for wire antenna 16 to fixedly or detachably connect wire antenna 16 to piece of fabric 16. In other embodiments, wire antenna 16 may be connected to piece of fabric 22 by ultrasonic (US) welding or the like, or may be stitched to piece of fabric 22.

INDUSTRIAL APPLICABILITY

As described above, with the RFID device according to the present disclosure, a RFID device having a small size, in particular, a form factor that allows for arranging the same, for example, inside a hem of a piece of cloth, and being flexible and difficult to detect can be provided. An exemplary width of RFID device in the transverse direction (perpendicular to the direction of extension of wire antenna 16 and in a plane that includes substrate 12) may be between 2 and 10 mm. A length of RFID device 10 including wire antenna 16 may be between 5 and 20 cm (for example, around 15 cm for a linear wire antenna, and around 5 to 10 cm (or less) in case of an arrangement of the wire antenna with one or more meanders or the like), and a thickness may be between 0.1 and 2 mm.

Further, the RFID device can be easily attached to the piece of material by connecting a mounting portion of the wire antenna to the piece of material, for example, by heating the same. Due to this heating, a fixed connection via a thermoset adhesive material can be obtained between wire antenna 16 and, for example, piece of fabric 22. As wire antenna 16 is attached to substrate 12 of RFID device 10, in this manner, substrate 12 can also be easily connected to piece of fabric 22. Accordingly, any bulky packaging or housing can be omitted. Further, RFID device 10 is very flexible, and can be easily hidden, for example, in a hem of a piece of clothing.

RFID device 10 is very easy to manufacture, and is also easy to connect to, for example, a piece of fabric 22. An exemplary process for manufacturing the RFID device 10 will be described below.

In a first step, substrate 12 having integrated circuit 14 mounted on the same is provided. Then, wire antenna 16 is attached to substrate 12 in such a manner as to be coupled to integrated circuit 14 to allow integrated circuit 14 to perform RFID communications via wire antenna 16. Finally, wire antenna 16 is connected to, for example, piece of fabric 22 in a state of being attached to substrate 12, to thereby connect substrate 12 to piece of fabric 22 via wire antenna 16.

In particular, the step of attaching wire antenna 16 may include passing wire antenna 16 through at least one, preferably at least two, through holes 24 formed in substrate 12, for example, from a first side S1 of substrate 12. Of course, it will be appreciated that wire antenna 16 can be laced to substrate 12 in any appropriate manner, for example, by being inserted from one side of the same, passed over a portion of substrate 12, and then being inserted through second through hole 24 formed on the opposite side.

The step of connecting wire antenna 16 may include heating at least one portion of wire antenna 16 in contact with piece of fabric 22. For example, the at least one portion of wire antenna 16 may be provided with coating 28 including a thermoset adhesive material, for example, a thermoset PU material. The step of heating may be performed in a temperature range between 190° C. and 220° C. Due to the small size, less energy is needed to connect wire antenna 16, and the time needed for the connection can also be shortened considerably.

While the above examples have been described in the context of attaching RFID device 10 to a piece of clothing, it will be readily appreciated that the above-described device and method can also be used in combination with other types of material, and in other applications, for example, fabrics such as cotton, polyester, wool, etc., and other materials which allow for the connection of wire antenna 16 by heating coating 28 of the same, for example, rubber materials used for tires, other plastics and the like.

It will be appreciated that the foregoing description provides examples of the disclosed systems and methods. However, it is contemplated that other implementations of the disclosure may differ in detail from the foregoing examples. All references to the disclosure or examples thereof are intended to reference the particular example being discussed at that point and are not intended to imply any limitation as to the general disclosure.

Recitation of ranges of values herein are merely intended to serve as a shorthand method for referring individually to each separate value falling within the range, unless otherwise indicated herein, and each separate value is incorporated into the specification as if it were individually recited herein. All method steps described herein can be performed in any suitable order, unless otherwise indicated or clearly contradicted by the context.

Although the preferred embodiments of the present disclosure have been described herein, improvements and modifications may be incorporated without departing from the scope of the following claims.

The invention claimed is:

1. An RFID device comprising:
a substrate;
an integrated circuit mounted on the substrate; and a wire antenna coupled to the integrated circuit to allow the integrated circuit to perform RFID communications via the wire antenna;

wherein:

the substrate includes an attachment portion for attaching the wire antenna to the substrate;

the wire antenna includes a connecting portion, extending away from the attachment portion of the substrate, at least a portion of the connecting portion comprising a coating, the coating configured, upon heating, to flow from the connecting portion of the wire antenna to a piece of fabric material to fixedly connect the wire antenna to the piece of fabric material, in a state of the wire antenna being attached to the substrate; and the substrate is configured to be connected to the piece of fabric material via the wire antenna.

2. The RFID device of claim 1, wherein the attachment portion includes at least one through hole formed in the substrate, the wire antenna being passed through the at least one through hole.

3. The RFID device of claim 2, wherein the attachment portion includes a pair of through holes formed in the substrate, the wire antenna being passed through the pair of through holes from a first side of the substrate and including a coupling portion extending across the substrate between the pair of through holes.

4. The RFID device of claim 3, wherein the substrate includes a guide portion configured to guide the coupling portion on the substrate.

5. The RFID device of claim 4, wherein the coupling portion at least partly surrounds the integrated circuit.

6. The RFID device of claim 1, wherein the coating is provided over the entire length of the wire antenna.

7. The RFID device of claim 1, wherein the coating includes a thermoset adhesive material configured to fixedly connect the wire antenna to the piece of fabric material via heating of the coating.

8. The RFID device of claim 7, wherein a temperature range in which the thermoset adhesive material is configured to connect the wire antenna to the piece of fabric material is between 190° C. and 220° C.

9. The RFID device of claim 7, wherein the thermoset adhesive material comprises a thermoset PU material.

10. The RFID device of claim 1, wherein the integrated circuit is configured to be inductively coupled to the wire antenna.

11. The RFID device of claim 1, wherein the wire antenna is configured as a linear dipole antenna.

12. A product comprising the RFID device of claim 1 connected to the product via the wire antenna.

13. The product of claim 12, wherein the product comprises a piece of clothing.

14. A method of manufacturing an RFID device, the method comprising:

providing a substrate having an integrated circuit mounted on the same;

attaching a wire antenna to the substrate, the wire antenna being coupled to the integrated circuit to allow the integrated circuit to perform RFID communications via the wire antenna; and connecting at least a portion of the wire antenna extending away from the substrate to a piece of fabric material, the portion of the wire antenna extending away from the substrate comprising a coating, the coating configured, upon heating, to flow from the portion of the wire antenna to the piece of fabric material to fixedly connect the wire antenna to the piece of fabric material, in a state of the wire antenna being attached to the substrate, to thereby connect the substrate to the piece of fabric material via the wire antenna.

15. The method of claim 14, wherein the step of attaching the wire antenna includes passing the wire antenna through at least one through hole formed in the substrate.

16. The method of claim 14, wherein the coating comprises a thermoset adhesive material, and wherein the step of connecting the wire antenna includes heating the at least a portion of the wire antenna.

17. The method of claim 16, wherein the thermoset adhesive material comprises a thermoset PU material.

* * * * *